United States Patent
Hawkins

(10) Patent No.: US 6,718,683 B2
(45) Date of Patent: Apr. 13, 2004

(54) REUSABLE SIMULATED BAIT FISH WITH INSERTABLE HEAD AND HOOK

(76) Inventor: Brian J. Hawkins, 39519 Coral Sky Ct., Murrieta, CA (US) 92563

( * ) Notice: Subject to any disclaimer, the term of this patent is extended or adjusted under 35 U.S.C. 154(b) by 0 days.

(21) Appl. No.: 10/213,594

(22) Filed: Aug. 6, 2002

(65) Prior Publication Data

US 2003/0024150 A1 Feb. 6, 2003

Related U.S. Application Data

(60) Provisional application No. 60/310,180, filed on Aug. 6, 2001.

(51) Int. Cl.$^7$ ............................................. A01K 91/00
(52) U.S. Cl. ..................... 43/42.39; 43/42.37; 43/42.38
(58) Field of Search ................................ 43/42.08, 42.1, 43/42.22, 42.24, 42.28, 42.35, 42.36, 42.37, 42.38, 42.39, 42.41, 44.2, 44.81

(56) References Cited

U.S. PATENT DOCUMENTS

| | | | | | |
|---|---|---|---|---|---|
| 3,465,466 A | * | 9/1969 | Showalter | ................... | 43/44.8 |
| 3,497,987 A | * | 3/1970 | Perrin | ........................ | 43/42.28 |
| 3,611,614 A | * | 10/1971 | Ward | ......................... | 43/42.24 |
| 3,724,117 A | * | 4/1973 | Flanagan, Jr. | ............... | 43/42.24 |
| 3,861,073 A | * | 1/1975 | Thomassin | ................... | 43/42.1 |
| 3,883,979 A | * | 5/1975 | Williams, Jr. | ............... | 43/42.09 |
| 4,771,567 A | * | 9/1988 | Cannon | ........................ | 43/42.26 |
| 4,843,754 A | * | 7/1989 | Spelts | ........................ | 43/42.1 |
| 4,887,377 A | * | 12/1989 | Morris | ....................... | 43/42.24 |
| 5,070,639 A | * | 12/1991 | Pippert | ....................... | 43/42.31 |
| 5,806,234 A | * | 9/1998 | Nichols | ...................... | 43/42.37 |
| 6,266,916 B1 | * | 7/2001 | Dugan | ........................ | 43/42.37 |
| 6,393,757 B2 | * | 5/2002 | Bomann | ..................... | 43/42.09 |

FOREIGN PATENT DOCUMENTS

JP          5-227862          *  9/1993

\* cited by examiner

*Primary Examiner*—Peter M. Poon
*Assistant Examiner*—David J Parsley
(74) *Attorney, Agent, or Firm*—Donald W. Meeker

(57) ABSTRACT

A hook and torpedo head weight are inserted through a narrow passageway into a cavity shaped to receive the weight in a cast rubber simulation of a live bait. The hook protrudes out the passageway. A fish line attaching eyelet on the head protrudes through a pre-cast forward opening in the simulated bait lure. The bait lure is cast of rubberized material in a variety of sizes and shapes depending on the target fish and its environment. The head is molded in a variety of sizes and weights to match the fish component and to account for the versatility for fishing the lure in shallow or deep waters. The bait lure simulates the look, posture, and motion of the live bait.

4 Claims, 3 Drawing Sheets

REUSABLE SIMULATED BAIT FISH WITH INSERTABLE HEAD AND HOOK

CLAIM OF PROVISIONAL APPLICATION RIGHTS

This application claims the benefit of U.S. Provisional Patent Application No. 60/310,180, filed on Aug. 6, 2001.

BACKGROUND OF THE INVENTION

1. Field of the Invention

The present invention relates to fishing lures and in particular to a rubberized natural looking simulated bait fish lure with a weighted hook insertable into a precisely positioned pre-cast cavity in the molded simulated bait fish lure to create a natural looking and swimming bait with an eye-let hole for the leader and an insert hole leaving the hook exposed above the lure to eliminate unnatural tear lines and improper positioning of the hook resulting in a stronger longer lasting natural looking and swimming bait which can be saved to be reused a number of times.

2. Description of the Prior Art

Catching fish relies on using a bait and hook simulating the food that fish normally feed on so that the feeding fish will attempt to eat the bait and hook and the fish will be hooked and pulled in on a fishing line.

Many fish feed on smaller fish called bait fish or other creatures found in the water such as crustaceans, crabs, worms, squid and others including creatures with varying types of tails, such as paddle tails and curl tails. Fishing lures to simulate small fish and other water creatures very often don't even look like the real thing nor do they simulate the movements of the real things. They often just attempt to attract a feeding fish by making some movement, not swimming movement, or just by the glitter of the lure.

A number of attempts have been made to create fishing lures and hooks that will be effective in attracting and catching fish.

Other lures require the need to insert the hook into the lure thus creating an unnatural tear line in the lure which will be further weakened by a striking fish. Additionally, other lures require the hook to be inserted straight down into the middle of the bait to the correct length and depth in order to achieve the correct balance which, if done precisely, results in a natural appearance and movement of the lure.

Lacking in the prior art patents is a fishing lure having a properly positioned weighted ballast in the bait fish for a more realistic swimming motion in the bait fish at various water depths as well as lures with protruding hooks and leader attachments to prevent tearing of the lures.

SUMMARY OF THE INVENTION

An object of the present invention is to provide a specific weight weighted hook insertable within a specifically shaped and specifically positioned cavity in a realistic molded fishing lure to produce realistic swimming motion at various water depths.

A related object of the present invention is to provide an accurately molded fishing lure with a precision placement of the interior cavity and a precision shaped weighted hook to insure that the weighted hook is positioned in an accurate upright orientation in the lure to produce a realistic straight swimming motion.

Another object of the present invention is to provide an insertable weighted hook wherein the hook and an eye-let for attaching the fishing line leader protrude from the top of the lure to prevent tearing of the lure when the fish bites the hook, thereby saving the lure or bait fish to be used again.

In brief, a unique fishing lure system eliminates the unnecessary tearing of the rubber lure and possibility of incorrect positioning of the hook, which would cause the bait to swim and appear unnatural.

A two-component system consists of a fish component and a hook component (that which is inserted into the fish component). The fish component consists of a realistic rubber fish-like body and head through which a molded cavity extends from behind the dorsal fin through to the head with a small exit hole above and behind the eye. The fish component is molded in a variety of sizes and shapes depending on the target fish and its environment (fresh or salt water.)

The second component consists of a curved, barbed hook at one end and a weighted torpedo-like head at the other end, which has the eye-let for attaching the fishing line extended forward and above the metal head at a 60 degree angle, 90 degree angle, or directly forward in the front of the head. The hook component is molded in a variety of sizes and weights to match the fish component and to account for the versatility for fishing the lure in shallow or deep waters.

The present invention eliminates the problems posed by other lures in that the head of the weighted hook is inserted into the pre-cast cavity in the lure, which is positioned at the precise length and depth of the lure and is composed to allow the eye-let of the hook to be exposed through a fabricated opening in the lure above the lure or in front of the lure to allow attachment of the fishing line. The present invention virtually eliminates unnatural tear lines and improper positioning of the hook resulting in a stronger, longer-lasting, natural looking and natural swimming bait.

Additionally, the present invention's precise positioning for the metal, torpedo-like head of the hook appears to look like the gill-plates of a natural bait fish, further enhancing life-like quality of the lure.

A somewhat flat narrow insertion cavity leads into a larger rounded cavity shaped to receive the weight precisely fitting within the larger cavity. This locks the weight into the larger cavity and prevents the weight from pulling out of the lure as well as precisely positioning the weight and hook, which extends back through the narrow insertion cavity and out the entrance opening for the insertion. The narrow cavity maintains the hook in straight alignment with the head for accurate upright appearance and accurate swimming motion in the water.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
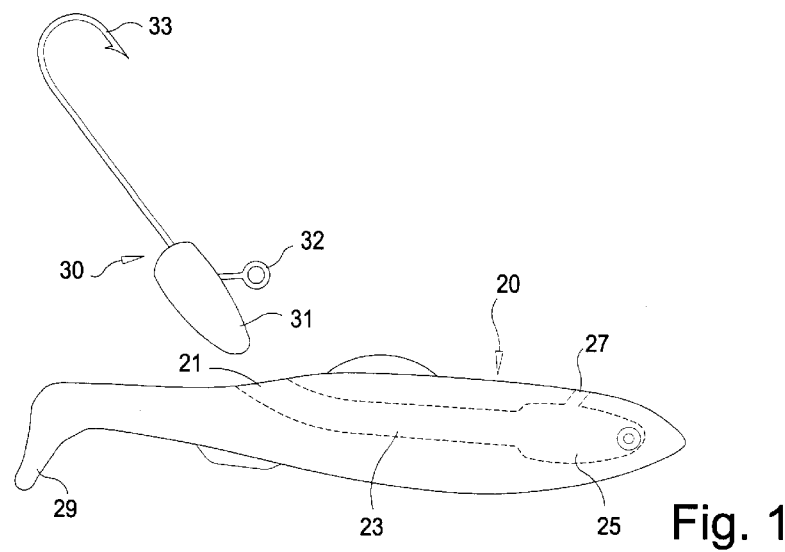
FIG. 1 is a side elevational view of the head and hook aligned for insertion in a molded lure of a simulated fish having a paddle tail showing the interior cavities in dashed lines.
Figure 2:
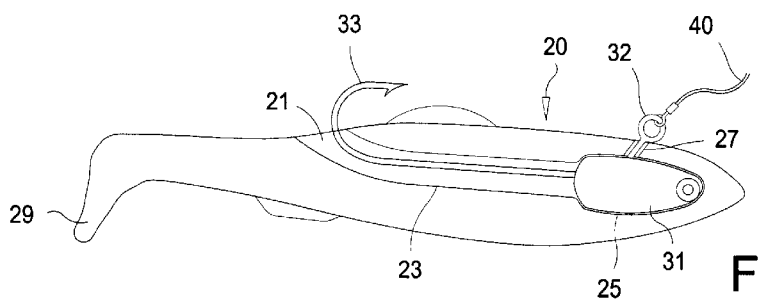
FIG. 2 is a cross-sectional view of the head and hook inserted in place in the molded lure of FIG. 1.
Figure 3:
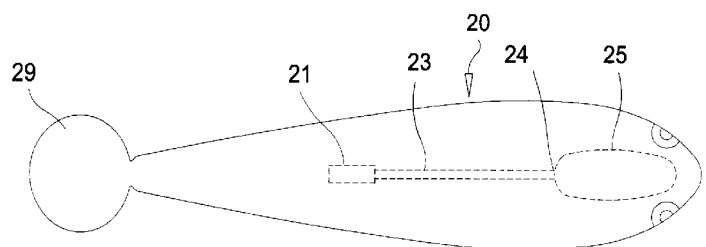
FIG. 3 is a top plan view of the molded lure of FIG. 1 showing the interior cavities in dashed lines.

In FIGS. 1–10, a simulated bait lure device for simulating the look and action of an actual live bait comprises a weighted hook 30 and 30A having a curved, barbed hook 33 and 33A at one end and a weighted torpedo-like head 31 at the other end, and a rubberized bait body 20, 20A, 20B, and 20C simulating a natural bait. The bait body 20, 20A, 20B, and 20C has an interior cavity 25 formed within the bait body, the cavity 25 shaped to receive the head 31 of the weighted hook fitted within the cavity with a tight friction fit. A flexible insertion hole 21 and cavity or passageway 23, flatter and narrower than the cavity 25 extends between the cavity 25 and the exterior of the bait body so that the head 31 of the weighted hook is insertable into the bait body through the flexible passageway 23 and into the cavity 25 with the hook 33 protruding out of the insertion hole 21 to the exterior of the bait body, the cavity being positioned and the head being sized and weighted so that the bait lure device simulates the natural upright position and motion of a live bait. The passageway 23 is smaller than the cavity 25 so that the head 31 of the weighted hook is retained positioned within the cavity 25 during trolling to simulate a natural swimming motion and does not slip out of the passageway 23 due to the ridge 24 created by the narrow passageway 23 where it intersects the cavity 25, is seen in FIG. 3.

In FIGS. 1, 2, 4, 5, 9 and 10 the head 31 of the weighted hook further comprises an eyelet 32 extending from a top portion of the head, preferably at a forward angle of 60 degrees and a forward opening 27 is formed through the top of the bait lure between the cavity 25 and the exterior of the bait lure at a point opposite the eyelet 32 to receive the eyelet 32 therethrough as a means for receiving a fishing line 40 to pull the bait lure.

Figure 7:
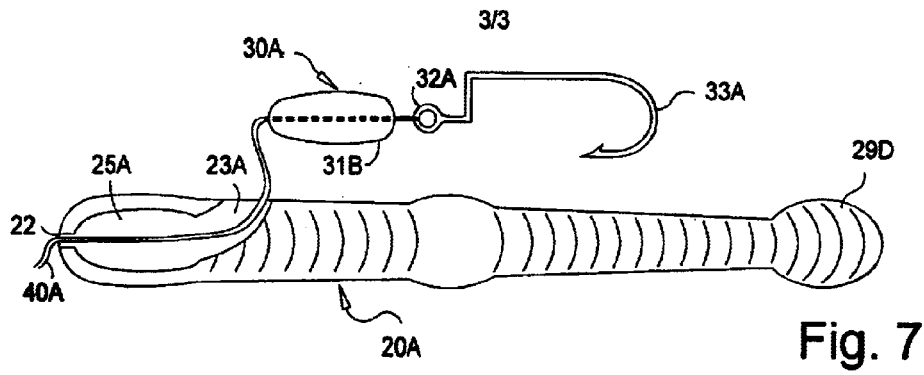
FIG. 7 is a cross-sectional view showing a fishing line through a central bore of an alternate sliding bullet or egg weight head and attached to an eye-let on the hook aligned for insertion in a molded lure of a simulated worm having a paddle tail showing the interior cavities.
Figure 8:
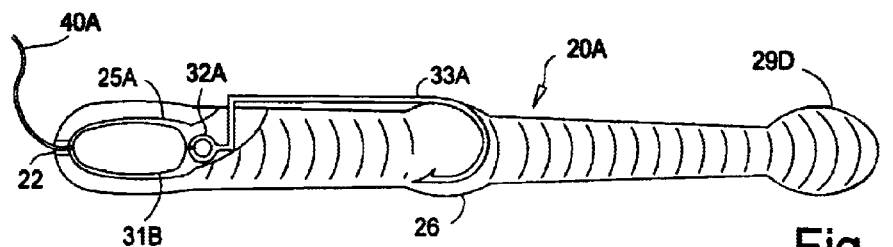
FIG. 8 is a cross-sectional view showing the fishing line through the central bore of the alternate sliding bullet or egg weight head and attached to the eye-let on the hook inserted in the molded lure of the simulated worm of FIG. 7 with the hook point hidden in a special hook receiving portion of the lure.

In FIGS. 7 and 8 a fishing line 40A runs through a front forward opening 22 in the bait lure and through a central bore of an alternate sliding bullet or egg weight head 31B and attaches to an eye-let 32A on the hook 33A.

The bait lure is formed of cast rubberlike material into any desired shape having a body and tail simulating a live bait and the cavity 25, the insertion hole 21 and passageway 23 and the forward opening 27 and 22 are all preformed in the bait lure so that the bait lure is capable of being used without tearing and thereby being reused.

The cavity 25 is positioned within the bait lure and the head 31 is weighted so that the bait lure swims at a desired depth in the water. The cavity 25 is centrally positioned between the sides of the bait lure within the bait lure and the head is weighted so that the bait lure maintains a natural upright floating position and a natural swimming motion.

The lures may be molded in various combinations including different types of tails on any of the lures and any type of natural bait including a fish, a crustacean, a squid, a worm, a frog, a salamander, an amphibian, or any other natural bait.

In FIGS. 1–3 the bait lure 20 is a simulated fish having a paddle tail.

Figure 4:
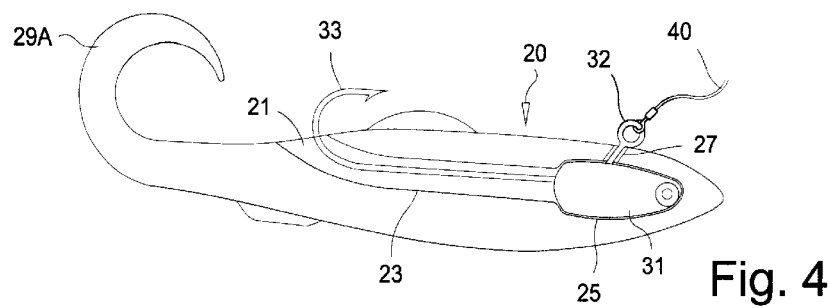
FIG. 4 is a cross-sectional view of the head and hook inserted in place in a molded lure of a single tail fish with the tail up.

In FIG. 4 the bait lure 20 is a single tail fish with the tail 29A up.

Figure 5:
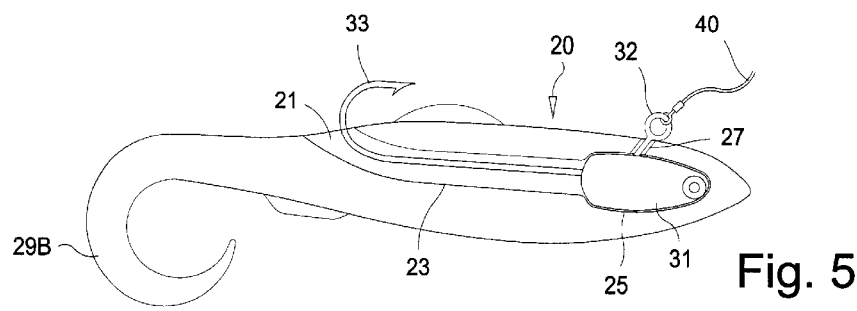
FIG. 5 is a cross-sectional view of the head and hook inserted in place in a molded lure of a single tail fish with the tail down.

In FIG. 5 the bait lure 20 is a single tail fish with the tail 29B down.

Figure 6:
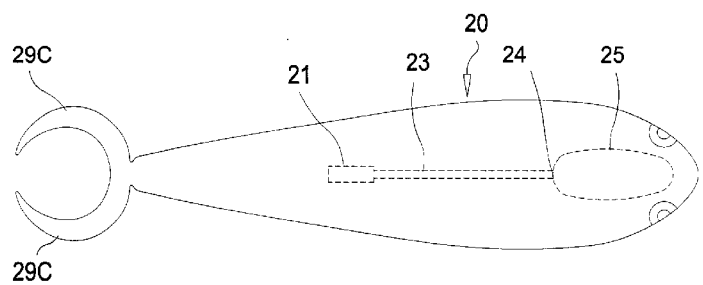
FIG. 6 is a top plan view of the molded lure of a twin tail fish showing the interior cavities in dashed lines.

In FIG. 6 the bait lure 20 is a twin tail fish with the twin tails 29C extending to the sides.

In FIGS. 7 and 8, an alternate bullet or egg weight head 31B and hook 33A with a front eye-let 32A fits into the cavity 25A with a short passageway 23A in a molded lure of a simulated worm 20A having a paddle tail 29D with the hook point 33A hidden in a special hook receiving portion 26 of the lure.

Figure 9:
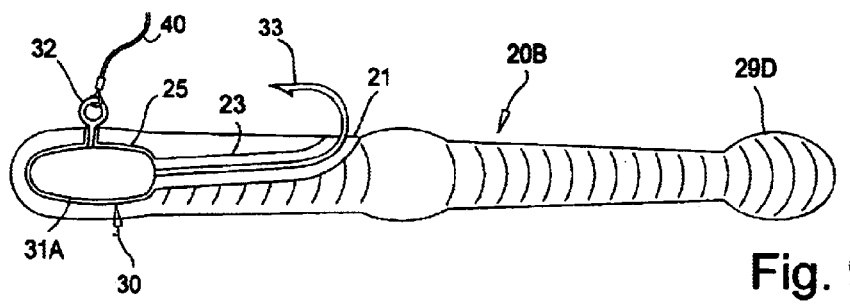
FIG. 9 is a cross-sectional view of another alternate bullet or egg weight head and hook with a top eye-let inserted in the molded lure of a simulated worm with eye-let protruding out of a built in hole on the top of the lure and the hook point protruding out of the insertion opening.

In FIG. 9 another alternate bullet or egg weight head 31A has a standard hook 33 protruding out an elongated passageway 23 through the insertion opening 21 and has a top eye-let 32 and is insertable in the molded lure 20B of a simulated worm having a paddle tail 29D.

Figure 10:
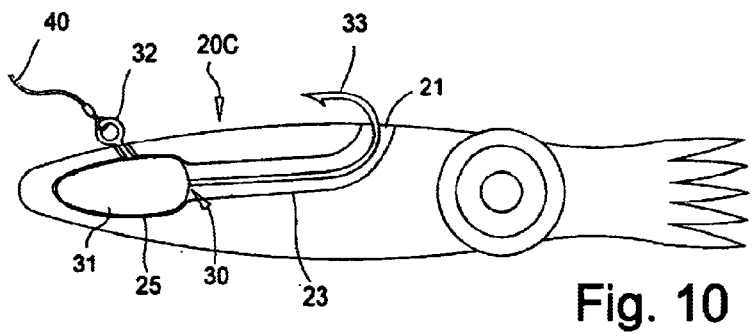
FIG. 10 is a cross-sectional view of a bullet or egg weight head and hook with a 60 degree angled top eye-let inserted in the molded lure of a simulated squid body with the eye-let protruding out of a built in hole on the top of the lure and the hook point protruding out of the insertion opening.

In FIG. 10 a bullet or egg weight head and hook 33 has a 60 degree angled top eye-let 32 and is inserted in the molded lure of a simulated squid body.

It is understood that the preceding description is given merely by way of illustration and not in limitation of the invention and that various modifications may be made thereto without departing from the spirit of the invention as claimed.

What is claimed is:

1. A simulated bait lure device for simulating the look and action of an actual live bait, the device comprising:

a weighted hook having a curved, barbed hook at one end and a weighted torpedo-like head at the other end, the head having an eyelet protruding therefrom to receive a fishing line;

a rubberized bait body simulating a natural bait, the bait body having an interior precisely positioned pre-cast cavity within the bait body centrally positioned between and spaced apart from the sides and top and bottom of the bait lure within the bait lure, the cavity shaped to receive the head of the weighted hook fitted within the cavity with a tight friction fit, and a flexible passageway between the cavity and the exterior of the bait body so that the weighted hook is insertable into the bait body through the passageway and into the cavity with the hook protruding out of the passageway to the exterior of the bait body, wherein the passageway is smaller than the cavity creating a ridge at the back of the cavity so that the head of the weighted hook is retained positioned within the cavity during trolling, the cavity being positioned so that the bait lure device simulates the natural upright position and swimming motion of a live bait, and the bait body having a fabricated opening in a front portion of the bait body between the cavity and the exterior to receive the eyelet from the head protruding through the fabricated opening to attach to a fishing line, and a shaped tail for simulating the swimming motion of a natural bait as water passes over the tail.

2. The device of claim 1 wherein the bait lure is formed of cast rubberlike material and the cavity, the passageway and the fabricated opening are all preformed in the bait lure so that when the head is inserted into and removed from the bait lure, the bait lure is less likely to tear.

3. The device of claim 2 wherein the eyelet protrudes from a top portion of the head and the fabricated opening is through the top of the bait lure at a point opposite the eyelet to receive the eyelet therethrough.

4. The device of claim 2 wherein the eyelet protrudes from a front portion of the head and the fabricated opening is through the front of the bait lure at a point opposite the eyelet to receive the eyelet therethrough.

* * * * *